United States Patent
Hoshina et al.

(10) Patent No.: US 12,211,989 B2
(45) Date of Patent: Jan. 28, 2025

(54) BATTERY AND BATTERY PACK

(71) Applicant: KABUSHIKI KAISHA TOSHIBA, Minato-ku (JP)

(72) Inventors: Keigo Hoshina, Yokohama (JP); Masanori Tanaka, Kashiwazaki (JP); Hironori Takatsuka, Kashiwazaki (JP); Yasuhiro Harada, Isehara (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1015 days.

(21) Appl. No.: 17/005,678

(22) Filed: Aug. 28, 2020

(65) Prior Publication Data

US 2020/0403217 A1    Dec. 24, 2020

Related U.S. Application Data

(63) Continuation of application No. PCT/JP2018/013919, filed on Mar. 30, 2018.

(51) Int. Cl.
*H01M 4/131*    (2010.01)
*H01M 4/36*     (2006.01)
(Continued)

(52) U.S. Cl.
CPC ........... *H01M 4/131* (2013.01); *H01M 4/366* (2013.01); *H01M 4/485* (2013.01); *H01M 4/621* (2013.01);
(Continued)

(58) Field of Classification Search
CPC ...... H01M 4/131; H01M 4/366; H01M 4/485; H01M 4/625; H01M 10/0525
See application file for complete search history.

(56) References Cited

U.S. PATENT DOCUMENTS

| | | | |
|---|---|---|---|
| 2009/0123844 A1* | 5/2009 | Morigaki ................ | H01M 4/62 429/231.95 |
| 2010/0092846 A1 | 4/2010 | Inagaki et al. | |

(Continued)

FOREIGN PATENT DOCUMENTS

| | | |
|---|---|---|
| JP | 9-129217 A | 5/1997 |
| JP | 9-265976 A | 10/1997 |

(Continued)

OTHER PUBLICATIONS

International Search Report issued Jul. 3, 2018 in PCT/JP2018/013919 filed Mar. 30, 2018, 2 pages.

*Primary Examiner* — Kenneth J Douyette
(74) *Attorney, Agent, or Firm* — Maier & Maier, PLLC

(57) ABSTRACT

According to one embodiment, a battery is provided. The battery includes a positive electrode, and a negative electrode including a negative electrode active material-containing layer including a niobium-titanium composite oxide and a conductive agent that includes a carbon material. The negative electrode active material-containing layer includes a principal surface facing the positive electrode. Assuming that the thickness of the negative electrode active material-containing layer is A, a ratio (C2/C1) of carbon content ratio C2 at a depth of 0.5 A from the principal surface to carbon content ratio C1 at a depth of 1 μm from the principal surface satisfies $2 \leq C2/C1 \leq 30$.

8 Claims, 6 Drawing Sheets

(51) Int. Cl.
*H01M 4/48* (2010.01)
*H01M 4/485* (2010.01)
*H01M 4/62* (2006.01)
*H01M 4/64* (2006.01)
*H01M 10/0525* (2010.01)
*H01M 4/02* (2006.01)

(52) U.S. Cl.
CPC ............ *H01M 4/625* (2013.01); *H01M 4/64* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2012/0009475 A1 | 1/2012 | Nakura | |
| 2012/0052401 A1* | 3/2012 | Goodenough | C01G 33/006 429/207 |
| 2016/0329557 A1* | 11/2016 | Sugimori | H01M 4/483 |

FOREIGN PATENT DOCUMENTS

| | | |
|---|---|---|
| JP | 2010-97720 A | 4/2010 |
| JP | WO 2011/114641 A1 | 6/2013 |
| JP | 2013-161732 A | 8/2013 |
| JP | 2013-535787 A | 9/2013 |

* cited by examiner

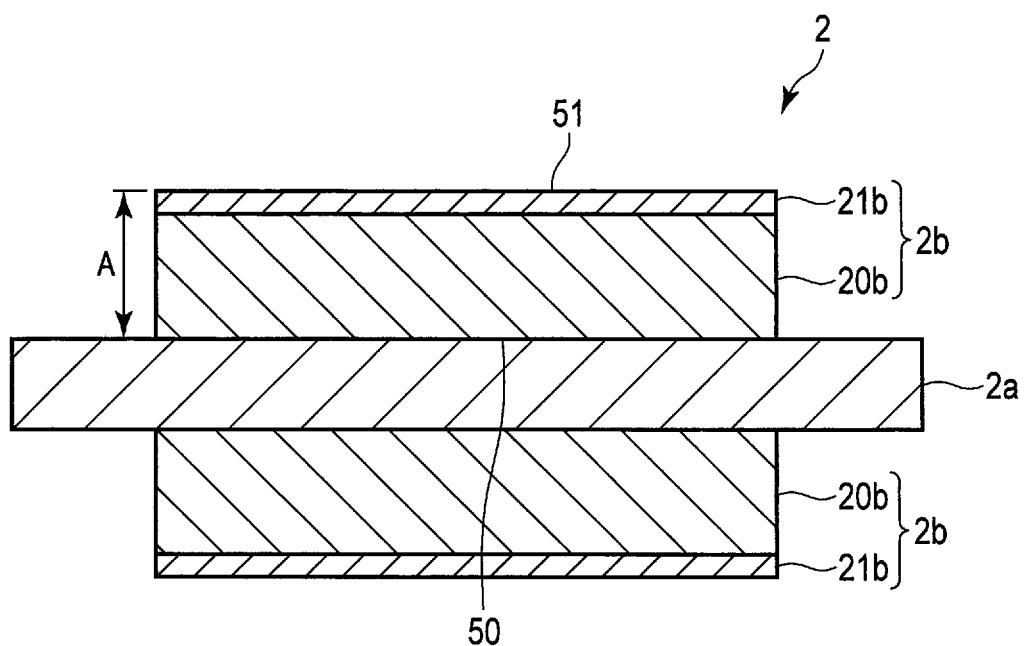
F I G. 1

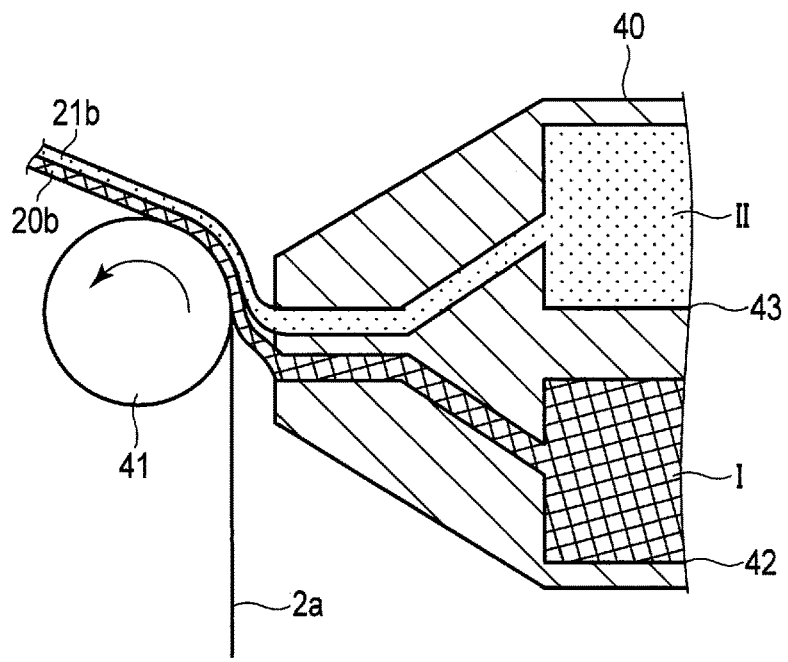
F I G. 2
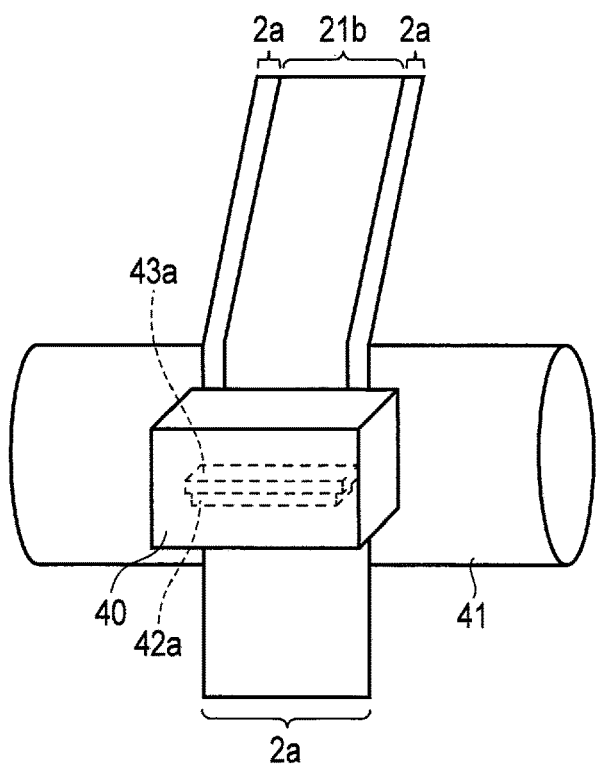
F I G. 3

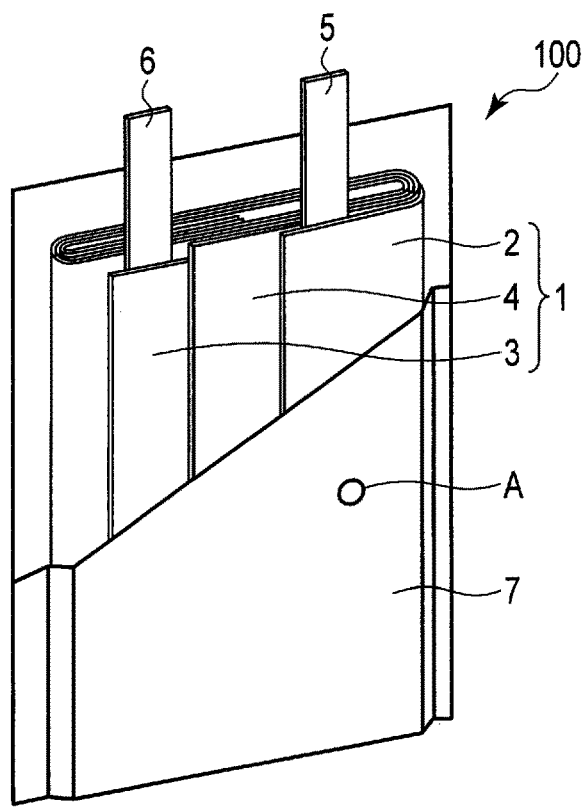
F I G. 4
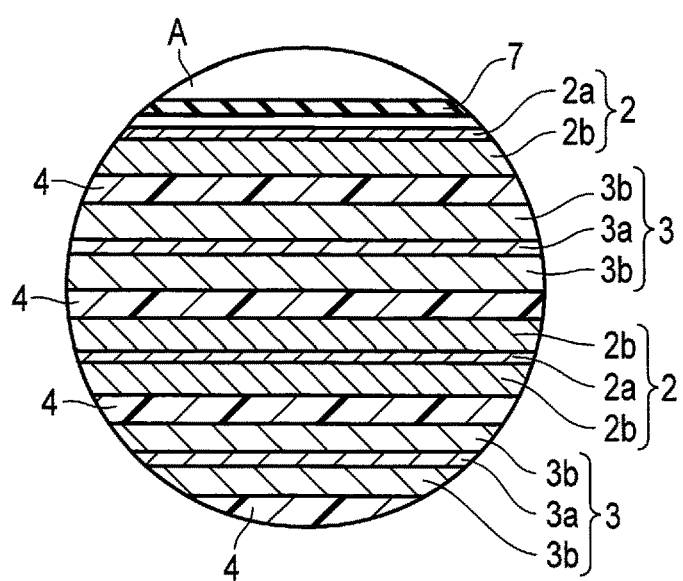
F I G. 5

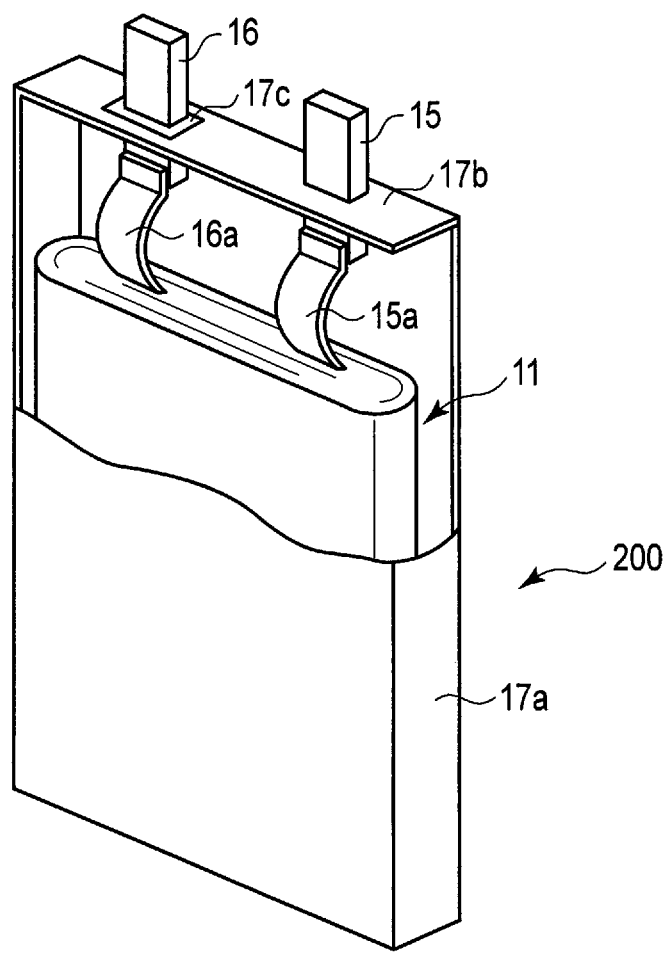
F I G. 6

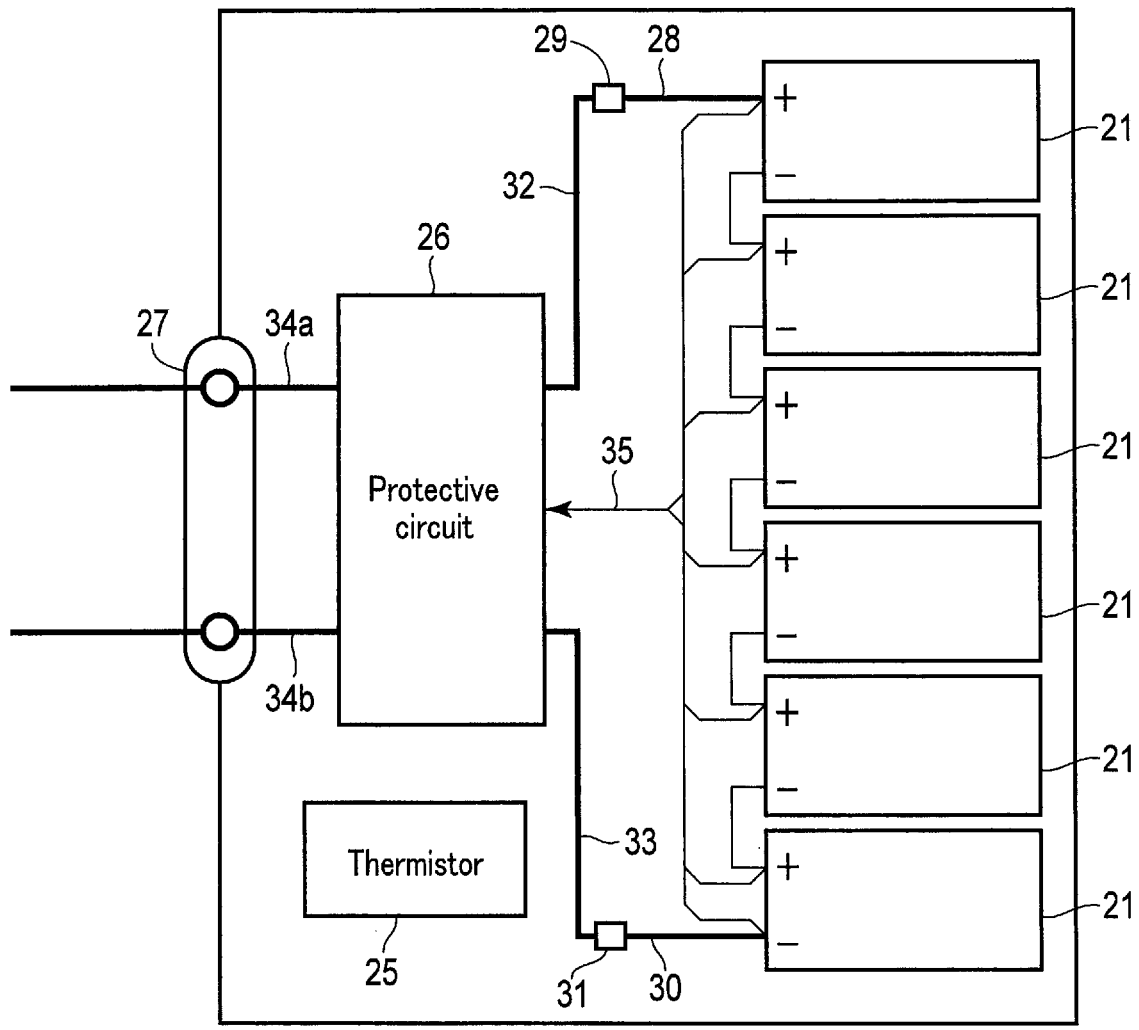
F I G. 8

BATTERY AND BATTERY PACK

CROSS-REFERENCE TO RELATED APPLICATIONS

This application is a Continuation Application of PCT Application No. PCT/JP2018/013919, filed Mar. 30, 2018, the entire contents of which are incorporated herein by reference.

FIELD

Embodiments described herein relate generally to a battery and a battery pack.

BACKGROUND

Lithium ion secondary batteries are widely used in mobile devices, automobiles, storage batteries, etc. The market for lithium ion secondary batteries as power storage devices is expected to broaden in the future.

Regarding lithium ion secondary batteries, negative electrodes including a titanium oxide are used in place of carbon-based negative electrodes. Lithium ion batteries using a titanium oxide as a negative electrode active material realize stable rapid charge and discharge.

As an example of a titanium oxide, a titanium-based oxide or lithium titanium-based oxide having a monoclinic β-type structure is attracting attention because of its high theoretical capacity of 335 mAh/g. Furthermore, a new electrode material including both Ti and Nb has been considered. Especially in a monoclinic niobium-titanium composite oxide represented by $TiNb_2O_7$, when lithium is inserted therein, the valence of Ti changes from tetravalent to trivalent and the valence of Nb changes from pentavalent to trivalent, so that the charge is compensated, thereby achieving a high theoretical capacity of 387 mAh/g. For this reason, $TiNb_2O_7$ is receiving attention.

BRIEF DESCRIPTION OF THE DRAWINGS

FIG. 1 is a schematic cross-sectional view showing an example of a negative electrode included in a battery according to a first embodiment;

FIG. 2 is a schematic view illustrating one step in a method of manufacturing the negative electrode shown in FIG. 1;

FIG. 3 is a schematic view illustrating one step in the method of manufacturing the negative electrode shown in FIG. 1;

FIG. 4 is a partially cut-out perspective view showing an example of the battery according to the first embodiment;

FIG. 5 is an enlarged cross-sectional view of section A of the battery shown in FIG. 4;

FIG. 6 is a partially cut-out perspective view showing another example of the battery according to the first embodiment;

FIG. 8 is a block diagram showing an example of an electric circuit in the battery pack shown in FIG. 7.

DETAILED DESCRIPTION

Figure 7:
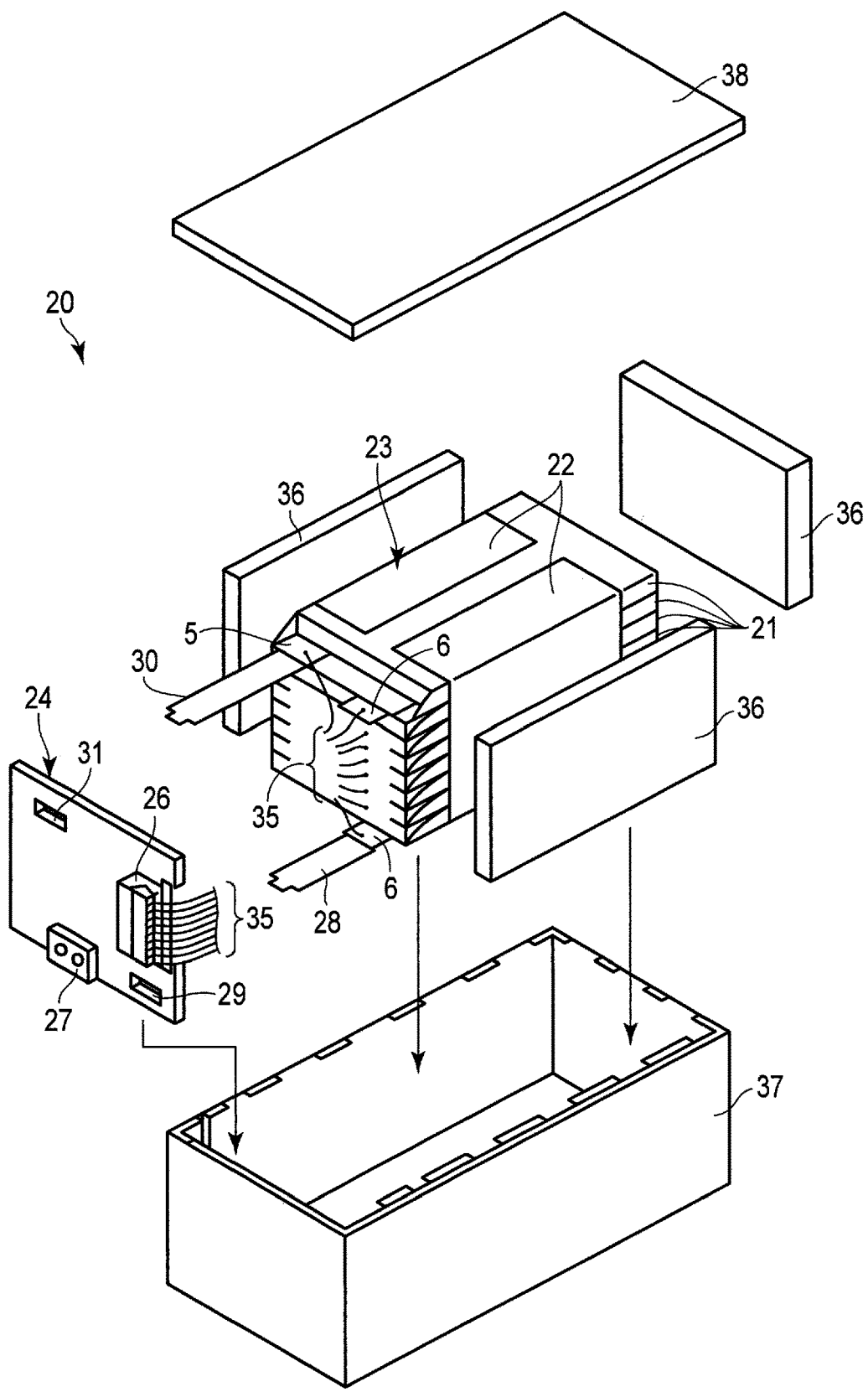
FIG. 7 is an exploded perspective view showing an example of a battery pack according to a second embodiment.

According to an embodiment, a battery is provided. The battery includes a positive electrode, and a negative electrode including a negative electrode active material-containing layer including a niobium-titanium composite oxide and a conductive agent that includes a carbon material. The negative electrode active material-containing layer includes a principal surface facing the positive electrode. Assuming that the thickness of the negative electrode active material-containing layer is A, a ratio (C2/C1) of carbon content ratio C2 at a depth of 0.5 A from the principal surface to carbon content ratio C1 at a depth of 1 μm from the principal surface satisfies $2 \leq C2/C1 \leq 30$.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, a battery is provided. The battery includes a positive electrode, and a negative electrode including a negative electrode active material-containing layer including a niobium-titanium composite oxide and a conductive agent that includes a carbon material. The negative electrode active material-containing layer includes a principal surface facing the positive electrode. Assuming that the thickness of the negative electrode active material-containing layer is A, a ratio (C2/C1) of carbon content ratio C2 at a depth of 0.5 A from the principal surface to carbon content ratio C1 at a depth of 1 μm from the principal surface satisfies $2 \leq C2/C1 \leq 30$.

A niobium-titanium composite oxide has insulation properties even when lithium ion is inserted therein and extracted therefrom in association with charging and discharging. In light of this, addition of a conductive agent such as a carbon material to a negative electrode including the niobium-titanium composite oxide has been performed in order to increase electron conductivity.

However, the carbon material has electro-conductivity regardless of a state of charge (SOC) of a niobium-titanium composite oxide, thereby causing the problem that when a battery is stored for a long time with the niobium-titanium composite oxide having its SOC of 100%, self-discharge is prone to proceed and a remaining capacity of the battery easily decreases.

In the battery according to an embodiment, the carbon content ratio at which the surface of the negative electrode facing the positive electrode, i.e., the surface of the negative electrode active material-containing layer is sufficiently smaller than the carbon content ratio in vicinity of a center along a thickness direction of the negative electrode active material-containing layer. Specifically, assuming that the thickness of the negative electrode active material-containing layer is A, in the principle surface of the negative electrode active material-containing layer facing the positive electrode, the ratio (C2/C1) of carbon content ratio C2 at a depth of 0.5 A from the principal surface to carbon content ratio C1 at a depth of 1 μm from the principal surface satisfies $2 \leq C2/C1 \leq 30$. The battery thus configured can prevent self-discharge even when it is stored for a long time.

Carbon content ratios C1 and C2 are measured by X-ray photoelectron spectroscopy (XPS). A detailed analysis method of XPS will be described later.

Hereinafter, the battery according to the embodiment will be described in detail.

The battery according to the embodiment includes a negative electrode and a positive electrode. The battery according to the embodiment may be, for example, a lithium ion secondary battery or a lithium ion nonaqueous electrolyte secondary battery.

The battery may further include a separator disposed between the negative electrode and the positive electrode. The negative electrode, the positive electrode, and the separator may constitute an electrode group. An electrolyte may be held in the electrode group. In the electrode group, a positive electrode active material-containing layer and a negative electrode active material-containing layer may face each other with the separator interposed therebetween.

The battery may include a container member housing the electrode group and the electrolyte, a negative electrode terminal electrically connected to the negative electrode, and a positive electrode terminal electrically connected to the positive electrode.

Hereinafter, the negative electrode, the positive electrode, the nonaqueous electrolyte, the separator, the container member, the negative electrode terminal, and the positive electrode terminal will be described in detail.

(1) Negative Electrode

The negative electrode may include a negative electrode current collector and a negative electrode active material-containing layer formed on the negative electrode current collector. The negative electrode active material-containing layer includes niobium-titanium composite oxide as a negative electrode active material. The negative electrode active material-containing layer may include a conductive agent and a binder.

The negative electrode current collector may include a portion a surface of which does not carry the negative electrode active material-containing layer. This portion may serve as a negative electrode tab. Alternatively, the negative electrode may further include a negative electrode tab separate from the negative electrode current collector.

FIG. 1 is a schematic cross-sectional view illustrating an example of the negative electrode included in the battery according to the embodiment.

A negative electrode 2 includes a negative electrode current collector 2a and a negative electrode active material-containing layer 2b. The negative electrode active material-containing layer 2b includes a first region 20b in the form of a layer stacked on the negative electrode current collector 2a and a second region 21b stacked on the first region 20b. The negative electrode current collector 2a is shaped like a rectangular foil extending in an in-plane direction. The negative electrode active material-containing layer 2b is shaped like a rectangular sheet extending in the in-plane direction. FIG. 1 illustrates a case in which the negative electrode active material-containing layer 2b is stacked on each of the surfaces of the negative electrode current collector 2a. The negative electrode active material-containing layer 2b may be formed on one of the surfaces of the negative electrode current collector 2a.

The negative electrode active material-containing layer 2b has a plurality of surfaces among which a surface having the maximum area is denoted as the principal surface of the negative electrode active material-containing layer 2b. In the negative electrode 2 shown in FIG. 1, the principal surface of the negative electrode active material-containing layer 2b denotes both a first surface 50 in contact with the negative electrode current collector 2a and a second surface 51 facing the first surface. At least part of the second surface 51 included in the negative electrode active material-containing layer 2b may face a positive electrode (not shown).

FIG. 1 shows an example in which the negative 2b has an explicit interface between the first region 20b and the second region 21b. However, this example is not a limitation. The negative electrode active material-containing layer 2b may vary in composition uninterruptedly from the first region 20b and the second region 21b without an explicit interface therebetween.

The first region 20b includes a niobium-titanium composite oxide, a binder, and a conductive agent including a carbon material. The niobium-titanium composite oxide has, for example, a granular shape. The niobium-titanium composite oxide may mainly include either primary particles or secondary particles. A niobium-titanium composite oxide particle may be or may not be coated with a carbon-containing layer. The niobium-titanium composite oxide particle included in the first region 20b is preferably coated with the carbon-containing layer. This case achieves a large increase in electron conductivity of the first region 20b. This case further achieves increase in carbon content ratio C2 of the first region 20b, which is to be described later.

The second region 21b includes a niobium-titanium composite oxide and a binder. The second region 21b may be formed of the niobium-titanium composite oxide and the binder. The second region 21b does not include a conductive agent including a carbon material. Furthermore, a niobium-titanium composite oxide particle included in the second region 21b is not coated with the carbon-containing layer. Therefore, carbon content ratio C1 to be described later in the second region 21b is smaller than carbon content ratio C2 in the first region 20b.

When the negative electrode active material-containing layer 2b has thickness A, the first region 20b includes a portion at a depth of 0.5 A from the second surface 51. The second region 21b includes a portion at a depth of 1 μm from the second surface 51.

When the negative electrode active material-containing layer 2b has thickness A, the thickness of the first region 20b falls within a range, for example, from 0.88 times to 0.97 times thickness A. The thickness of the second region 21b falls within a range, for example, from 0.03 times to 0.12 times thickness A. As described above, carbon content ratio C1 of the second region 21b is smaller than carbon content ratio C2 of the first region 20b. For this reason, if the second region 21b is too large in thickness relative to thickness A of the negative electrode active material-containing layer 2b, the battery is deteriorated in input/output characteristics. This is not preferable. Accordingly, it is preferable that the second region 21b be as small as possible in thickness.

Thickness A of the negative electrode active material-containing layer 2b falls within a range, for example, from 25 μm to 100 μm. Thickness A of the negative electrode active material-containing layer 2b may be appropriately varied depending on intended use of the battery. For example, if intended use of the battery requires energy density, thickness A of the negative electrode active material-containing layer 2b may be set relatively large. If intended use of the battery requires good input/output characteristics, thickness A of the negative electrode active material-containing layer 2b may be set relatively small. The thickness of the first region 20b falls within a range, for example, from 22 μm to 40 μm. The thickness of the first region 20b is obtained by subtracting the thickness of the second region 21b from thickness A of the negative electrode active material-containing layer 2b. The thickness of the second region 21b from the second surface 51 is, for example, 3 µm or lower. The thickness of the second region 21b from the second surface 51 falls within a range, for example, from 1 µm to 3 µm. The thickness of the second region 21b from the second surface 51 falls within a range, preferably from 1 µm to 2 µm.

Carbon content ratios C1 and C2 are analyzed by X-ray photoelectron spectroscopy (XPS). Carbon content ratio C1 is measured as follows. After the negative electrode active material-containing layer 2b is shaved from the second surface 51 toward the first surface 50 down to a depth of 1 µm, a carbon content (atm %) is measured using the XPS at this depth. This is carbon content ratio C1. In other words, carbon content ratio C1 may also be expressed as a carbon content within the second region 21b or a carbon content of the second region 21b. When the negative electrode active material-containing layer 2b has thickness A, carbon content ratio C2 is measured as follows. After the negative electrode active material-containing layer 2b is shaved from the second surface 51 toward the first surface 50 down to a depth of 0.5 A, a carbon content (atm %) is measured using the XPS at this depth. This is carbon content ratio C2. In other words, carbon content ratio C2 may also be expressed as a carbon content ratio within the first region 20b or a carbon content ratio of the first region 20b.

A surface and interfacial cutting analysis system (SAICAS) is used for Shaving of the negative electrode active material-containing layer. The SAICAS corresponds to a surface/interface cutting test apparatus.

The XPS is performed on the negative electrode that is extracted from the battery through the following steps. First, in a thermostatic bath at 25° C., the battery is discharged at a constant current of current value [A] equivalent to 0.2 C until the battery voltage reaches 1.5 V. Thereafter, the battery is discharged at a constant voltage of 1.5 V for one hour. After discharging at a constant voltage, the battery is disassembled inside an argon glove box. The electrode group is extracted from the container member inside the glove box, and the negative electrode is further extracted. At this time, it can be judged that an electrode connected to a negative electrode terminal of the battery is the negative electrode. The negative electrode thus extracted is immersed in ethyl methyl carbonate for 10 minutes and is then extracted and dried. The XPS is performed on a negative electrode sample thus prepared.

As a device for performing XPS, QuanteraSXM, manufactured by PHI or a device having a similar function thereto may be used. For the excitation X-ray source, single crystal spectral Al-Kα (1486.6 eV) is used, and the photoelectron detection angle is set to 45°.

The ratio (C2/C1) of carbon content ratio C2 to carbon content ratio C1 satisfies $2 \leq C2/C1 \leq 30$. When the ratio (C2/C1) is 2 or more, a surface layer has lower electric conductivity than an inside of the electrode, so that self-discharge of a secondary battery can be prevented. On the other hand, when the ratio (C2/C1) exceeds 30, a carbon material included within the electrode is excessive. Thus, there is a concern that electrolyte decomposition reaction in association with charging/discharging is prone to occur. For this reason, the ratio (C2/C1) is 30 or lower. The ratio (C2/C1) preferably satisfies $8 \leq C2/C1 \leq 21$.

Examples of the niobium-titanium composite oxide include a monoclinic niobium-titanium composite oxide. Examples of the monoclinic niobium-titanium composite oxide include a compound represented by $Li_xTi_{1-y}M1_yNb_{2-z}M2_zO_{7+\delta}$. Herein, M1 is at least one selected from the group consisting of: Zr; Si; and Sn. M2 is at least one selected from the group consisting of: V; Ta; and Bi. Respective subscripts in the composition formula represent $0 \leq x \leq 5$, $0 \leq y < 1$, $0 \leq z < 2$, and $-0.3 \leq \delta \leq 0.3$. Specific examples of the monoclinic niobium-titanium composite oxide include $Li_xNb_2TiO_7$ ($0 \leq x \leq 5$).

Another example of the monoclinic niobium-titanium composite oxide is a compound represented by $Li_xTi_{1-y}M3_{y+z}Nb_{2-z}O_{7-\delta}$. Herein, M3 is at least one selected from Mg, Fe, Ni, Co, W, Ta and Mo. Respective subscripts in the composition formula represent $0 \leq x \leq 5$, $0 \leq y < 1$, $0 \leq z < 2$, and $-0.3 \leq \delta \leq 0.3$.

The niobium-titanium composite oxide may include one selected from the above compounds or may include a mixture of more than two of the compounds.

An average primary particle size of the niobium-titanium composite oxide falls within a range, for example, from 0.2 µm to 5 µm, preferably from 0.5 µm to 2 µm. An average secondary particle size of the niobium-titanium composite oxide falls within a range, for example, from 6 µm to 25 µm, preferably from 8 µm to 12 µm. In order to decrease a thickness of the second region 21b and to form the smooth second region 21b, it is preferable that the niobium-titanium composite oxide included in the second region 21b mainly include primary particles. The average primary particle size and the average secondary particle size of the niobium-titanium composite oxide can be measured by SEM-EDX and X-ray diffraction (XRD).

A cross section is cut out by Ar ion milling from the negative electrode sample extracted by the method described above. In the cut-out cross section, the active material particles as a measurement target is observed with a scanning electron microscope (SEM). Preparing of the sample is also performed in an inert atmosphere using argon, nitrogen, etc., in such a manner as to avoid contact with air.

Using SEM observation image at 3000 times magnification, several particles are selected in a random manner. At this time, the particles are selected such that the particle size distribution of the selected particles is spread as widely as possible.

Next, an element analysis using an energy dispersive X-ray spectrometry (EDX) is performed on each of the selected particles. By this analysis, elements contained in the selected particles can be specified in terms of type and amount.

If the observed particles include Ti, Nb, and O, and further, if an X ray diffraction pattern belonging to $TiNb_2O_7$ is obtained from an active material as a measurement target in an XRD measurement to be described later, the active material as a measurement target is specified as $TiNb_2O_7$.

If a secondary particle is observed in the SEM observation image, composition analysis is performed by the EDX with respect to the observed secondary particle.

By the method described above, a primary particle and a secondary particle, which include $TiNb_2O_7$, can be specified in an SEM image of a battery active material as a measurement target.

By combining an analysis result of an X-ray diffraction pattern with an element analysis result of each particle included in an active material as a measurement target obtained by the SEM-EDX, an observed active material particle can be estimated.

In order to obtain a particle size, SEM observation is used. In the SEM observation of the battery active material described above, an image of an active material powder is obtained at 3000 times magnification. A group of primary particles in contact with each other, which can be viewed in the obtained field of view, is determined to a secondary particle.

A primary particle size is determined from a diameter of the smallest circle of circles corresponding to primary particles. Specifically, a particle size is measured 10 times using an SEM image at 3000 times magnification, and a primary particle size is determined to an average of the smallest circles respectively obtained from 10 measurement operations. Calculation of the average uses neither a maximum value nor a minimum value of particle sizes obtained from 10 measurement operations.

A secondary particle size is measured by a similar method to that of the primary particle. That is, a diameter of the smallest circle corresponding to a secondary particle is determined. Specifically, a particle size is measured 10 times using an SEM image at 3000 times magnification, and a secondary particle size is determined to an average of the smallest circles respectively obtained from 10 measurement operations. Calculation of the average uses neither a maximum value nor a minimum value of particle sizes obtained from 10 measurement operations.

The X-ray diffraction pattern (XRD) measurement is performed using CuKα rays as an X-ray source within the measurement range of 2θ=10° to 90°. By the aforementioned measurement, an X ray diffraction pattern of a compound included in active material particles can be obtained.

As an apparatus for powder X-ray diffraction measurement, SmartLab manufactured by Rigaku Corporation is used. The measurement conditions are as follows: Cu target; 45 kV 200 mA; Soller slit: 5° for both light incidence and light reception; step width: 0.02 deg; scan speed: 20 deg/min; semiconductor detector: D/teX Ultra 250; sample plate holder: parallel plate glass sample plate holder (thickness of 0.5 mm); and measurement range: $10° \leq 2\theta \leq 90°$. When another apparatus is used, measurement is performed using a standard Si powder for powder X-ray diffraction. This measurement is to discover conditions for obtaining equivalent measurement results of a peak intensity, a half width, and a diffraction angle to those obtained using the above apparatus. Under this discovered condition, sample measurement is performed.

The XRD measurement for an electrode taken out by the method described above may be performed as follows. The electrode as a measurement target is cut to extract its portion having about the same area as that of the wide angle X-ray diffraction apparatus holder, and the extracted portion is directly attached to a glass holder and is measured. For this, the XRD measurement is conducted in advance for a current collector in order to ascertain a position in which a peak derived from the current collector appears. In addition, the presence/absence of a peak of an agent such as a conductive agent, a binder, etc., is also ascertained in advance. If peaks of the current collector and the active material overlap each other, it is desirable that the active material-containing layer be separated from the current collector, and then subjected to measurement. This is to separate the overlapping peaks when the peak intensity is quantitatively measured. The above operations can be omitted, provided that the overlapping peaks are ascertained beforehand. The active material-containing layer may be physically separated. In this case, the active material-containing layer is easily separated when it is irradiated with an ultrasonic wave in a solvent. By measuring the active material-containing layer thus collected, the wide angle X-ray diffraction measurement can be performed on active material particles.

By the steps described above, an XRD pattern of a compound included in active material particles can be obtained. From the obtained XRD pattern, a crystal structure of the compound included in the active material particles can be identified.

The BET specific surface area of a particles of niobium-titanium composite oxide is not particularly limited, and is preferably 0.1 $m^2/g$ or more and less than 100 $m^2/g$. When the specific surface area is 0.1 $m^2/g$ or more, the contact area between the particle and electrolytic solution can be secured, good discharge rate performance to be easily obtained, and a charge time to be shortened. On the other hand, When the specific surface area less than 100 $m^2/g$, the reactivity between the particles and electrolyte solution does not get too high, and the life performance can be improved. Furthermore, particles of niobium-titanium composite oxide with the specific surface area less than 100 $m^2/g$ realizes the improved coatability of a slurry which includes an active material and is used to manufacture an electrode to be described later.

The negative electrode active material-containing layer may further include an active material other than the niobium-titanium composite oxide. Examples of an active material other than the niobium-titanium composite oxide include lithium titanate having a ramsdellite structure (e.g., $Li_{2+y}Ti_3O_7$, $0<y\leq3$), lithium titanate having a spinel structure (e.g., $Li_{4+x}Ti_5O_{12}$, $0<x\leq3$), monoclinic titanium dioxide ($TiO_2(B)$), anatase type titanium dioxide, rutile type titanium dioxide, a hollandite type titanium composite oxide, and an orthorhombic titanium-containing composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $0.5 \leq \sigma \leq 0.5$. Specific examples of the orthorhombic titanium-containing composite oxide include $Li_{2+a}Na_2Ti_6O_{14}$ ($0 \leq a \leq 6$).

The conductive agent is added to improve current collection performance and to suppress the contact resistance between the active material and the current collector. The conductive agent includes a carbon material. Examples of the conductive agent include vapor grown carbon fibers (VGCFs), carbon black, graphite, carbon nanotubes (CNTs), and fullerenes. Examples of the carbon black include acetylene black and Ketjen black. One of these may be used as the conductive agent, or two or more may be used in combination as the conductive agent. Alternatively, instead of using the conductive agent, the surfaces of the active material particles may be coated with a carbon-containing layer or an electro-conductive inorganic material.

Herein, a carbon component included in the carbon-containing layer will be described.

Analysis of the carbon-containing layer by Raman spectroscopy using a measurement light source of 532 nm enables the determination of crystallinity of a carbon component. In a Raman chart regarding a carbon component, a G band measured in the vicinity of 1580 $cm^{-1}$ is a peak derived from a graphite structure, whereas a D band measured in the vicinity of 1330 $cm^{-1}$ is a peak derived from a defect structure of a carbon. These G band and D band may be shifted from 1580 $cm^{-1}$ and 1330 $cm^{-1}$ by about ±50 $cm^{-1}$ due to various factors.

A carbon material in which the ratio of peak intensity $I_G$ of the G band to peak intensity $I_D$ of the D band, i.e., the ratio $I_G/I_D$, in a Raman chart is 0.8 or more and 1.2 or less indicates excellent crystallinity of graphite. Such a carbon component can enjoy excellent conductivity.

(Method of Examining Carbon Component in Carbon-Containing Layer)

Crystallinity of a carbon component included in the carbon-containing layer can be quantitatively evaluated with a Raman microspectroscopy. As the Raman microspectroscopy, for example, Thermo Fisher Scientific ALMEGA may be used. Measurement may be performed under the condition in which, for example, a laser wavelength is 532 nm, a slit size is 25 µm, a laser intensity is 10%, an exposure time is 5 s, and the cumulative number is 10.

Raman spectroscopy measurement may be performed by, for example, the steps described below.

To evaluate negative electrode active material particles incorporated in the battery, first, the battery is discharged completely in order to completely extract lithium ions therefrom. However, some lithium ions even in a discharged state may remain in the battery.

Next, the battery is disassembled in a glove box filled with argon, and the electrode is washed with an appropriate solvent. This washing may use, for example, ethyl methyl carbonate. Next, the active material-containing layer is separated from the washed electrode, thereby collecting a sample.

By using the collected sample, Raman spectroscopy measurement is performed under the condition described above.

In advance of measurement, the current collector and other components included in an agent, such as a conductive agent, a binder, etc., are ascertained in terms of the presence/absence of Raman scattering and position in spectrum. If a plurality of peaks overlap each other, peaks of components other than an active material need to be separated.

In the active material-containing layer, if the active material is mixed with a conductive agent (for example, if a surface of a niobium-titanium composite oxide particle is coated with the carbon-containing layer), it may be difficult to distinguish a carbon material included in the active material from a carbon material incorporated as the conductive agent. In such a case, one of the methods of distinguishing them from each other is that a binder is dissolved with, e.g., a solvent and is removed, and thereafter, an active material having a large specific gravity is taken out by executing centrifugal separation. The above method enables the active material and the conductive agent to separate from each other, so that the carbon material included in the active material can be measured while being included in the active material.

Alternatively, the following method may be adopted. Raman mapping can be utilized to separate a conductive agent component from an active material component with Raman microscope. After that, the spectrum assigned to the active materials is evaluated.

The binder is added to fill gaps among the dispersed active material particles and also to bind the active material with the negative electrode current collector. Examples of the binder include polytetrafluoro ethylene (PTFE), polyvinylidene fluoride (PVdF), fluororubber, styrene-butadiene rubber, a polyacrylic acid compound, an imide compound, carboxymethyl cellulose (CMC), salts of CMC, polyimide, and polyamide. As the binder, one of them may be used, or two or more may be used in combination.

In the first region 20b included in the negative electrode active material-containing layer 2b, the mixing ratio of the negative electrode active material is preferably 70 wt % or more and 96 wt % or less, the mixing ratio of the conductive agent is preferably 2 wt % or more and 28 wt % or less, and the mixing ratio of the binder is preferably 2 wt % or more and 28 wt % or less. Blending the conductive agent in a proportion of 2 wt % or more realizes excellent large current performance by virtue of high current collection performance. Furthermore, setting the amount of the binder to 2 wt % or more enhances binding property between the negative electrode active material-containing layer and the negative electrode current collector and thus realizes the improved cycling performance. On the other hand, from the viewpoint of a high capacity, the amount of each of the conductive agent and binder is preferably 28 wt % or less.

In the second region 21b included in the negative electrode active material-containing layer 2b, the mixing ratio of the negative electrode active material is preferably 90 wt % or more and 98 wt % or less, and the mixing ratio of the binder is preferably 2 wt % or more and 10 wt % or less.

The negative electrode current collector is preferably made of an aluminum foil or aluminum alloy foil electrochemically stable within a noble potential range that is more noble than 1.0 V.

Next, a method of manufacturing a negative electrode included in the battery according to the embodiment will be described.

This negative electrode can be manufactured by applying first slurry and second slurry simultaneously onto the current collector and then drying them. Herein, the first slurry is for forming the first region 20b included in the negative electrode active material-containing layer 2b. The second slurry is for forming the second region 21b. In this description, the above case is referred to as two-layer simultaneous coating. Alternatively, the negative electrode can be manufactured by the following way. The first slurry is applied on the current collector and is then dried to form the first region 20b. Thereafter, the second slurry is further applied and dried. In this manner, the second region 21b is formed on the first region 20b. In this description, the above case is referred to as sequential coating.

An exemplary manufacturing method in the case of two-layer simultaneous coating will be described with reference to FIGS. 2 and 3. According to the two-layer simultaneous coating, it is possible to manufacture, for example, the negative electrode active material-containing layer 2b having no explicit interface between the first region 20b and the second region 21b.

In the two-layer simultaneous coating, the first slurry for forming the first region 20b and the second slurry for forming the second region 21b are simultaneously applied on at least one of the front surface and the rear surface of the negative electrode current collector 2a. The first slurry is prepared by suspending a niobium-titanium composite oxide, a conductive agent, and a binder in an appropriate solvent. The second slurry is prepared by suspending a niobium-titanium composite oxide and a binder in an appropriate solvent.

Exemplary coating steps are shown in FIGS. 2 and 3. A coating apparatus 40 includes a tank 42 that houses the first slurry (hereinafter, referred to as slurry I), a tank 43 that houses the second slurry (hereinafter, referred to as slurry II), and is configured to simultaneously apply slurry I and slurry II onto a substrate such as the current collector. In a discharge port for slurry I, its width orthogonal to a coating direction corresponds to a coating width in the first region 20b included in the negative electrode active material-containing layer 2b. The long negative electrode current collector 2a still not cut into a predetermined size is conveyed with a conveyance roller 41 to slurry discharge ports of the coating apparatus 40. In FIG. 3, a slurry-I discharge port 42a is positioned upstream from a slurry-II discharge port 43a along the current collector. The slurry-I discharge port 42a is smaller in width orthogonal to the coating direction than the slurry-II discharge port 43a. The coating apparatus 40 applies slurry I onto the negative electrode current collector 2a except for its both ends in the short side direction. At approximately the same time, slurry II is applied to cover slurry I in such a manner that slurry II extends off a region coated with slurry I. Slurry II is applied to cover slurry I before slurry I is dried. Accordingly, slurry II can easily follow the surface shape of slurry I. After the slurry is dried, the dried slurry is subjected to roll pressing, and the current collector is then cut into a predetermined size. In this manner, the negative electrode can be obtained.

In the case of the sequential coating, for example, the first slurry is applied on one surface or both reverse surfaces of the long negative electrode current collector 2a. The applied slurry is then dried to obtain a layered stack in which the first region 20b is stacked on the negative electrode current collector 2a. Next, the second slurry is applied on the first region 20b. At this time, the second slurry may be applied on the first region 20b already formed and on the negative electrode current collector 2a in such a manner that a coating width of the second slurry is larger than a length in the short side direction of the first region 20b. The second slurry is then dried to obtain a layered stack including the negative electrode current collector 2a, the first region 20b, and the second region 21b. The obtained stack is subjected to pressing and is cut into a predetermined size. In this manner, the negative electrode can be obtained.

(2) Positive Electrode

The positive electrode includes a positive electrode current collector and a positive electrode active material-containing layer (positive electrode material layer) that is supported on one surface or both reverse surfaces of the positive electrode current collector and includes a positive electrode active material, a positive electrode conductive agent, and a binder.

As the positive electrode active material, for example, a lithium transition metal composite oxide may be used. Examples of the lithium transition metal composite oxide include $LiCoO_2$, $LiNi_{1-x}Co_xO_2$ ($0<x<0.3$), $LiMn_xNi_yCo_zO_2$ ($0<x<0.5$, $0<y<0.5$, $0\leq z<0.5$), $LiMn_{2-x}M_xO_4$ (M is at least one element selected from the group consisting of Mg, Co, Al, and Ni, $0<x<0.2$), and $LiMPO_4$ (M is at least one element selected from the group consisting of Fe, Co, and Ni).

Another example is $Li_uMeO_2$ having a layered structure (Me is at least one element selected from the group consisting of Ni, Co, and Mn). Examples of such $Li_uMeO_2$ include a lithium-nickel composite oxide (e.g., $Li_uNiO_2$), a lithium-cobalt composite oxide (e.g., $Li_uCoO_2$), a lithium nickel cobalt composite oxide (e.g., $Li_uNi_{1-s}Co_sO_2$), a lithium manganese cobalt composite oxide (e.g., $Li_uMn_sCo_{1-s}O_2$), a lithium nickel cobalt manganese composite oxide (e.g., $Li_uNi_{1-s-t}Co_sMn_tO_2$), a lithium-nickel-cobalt-aluminum composite oxide ($Li_uNi_{1-s-t}Co_sAl_tO_2$), a lithium-manganese composite oxide having a spinel structure (e.g., $Li_uMn_2O_4$ and $Li_uMn_{2-s}Al_sO_4$), and a lithium phosphate having an olivine structure (e.g., $Li_uFePO_4$, $Li_uMnPO_4$, $Li_uMn1-sFesPO_4$, and $Li_uCoPO_4$). The above compounds preferably satisfy $0<u\leq1$, $0\leq s\leq1$, and $0\leq t\leq1$. As the positive electrode active material, a spinel lithium-manganese composite oxide such as $Li_uMn_2O_4$ or $Li_uMn_{2-s}Al_sO_4$ may be singly used, or a plurality of compounds may be used in combination.

In particular, it is preferable to include a lithium-manganese composite oxide having a spinel structure (e.g., $Li_uMn_2O_4$ and $Li_uMn_{2-s}Al_sO_4$), a lithium-cobalt composite oxide ($Li_uCoO_2$), a lithium nickel cobalt composite oxide (e.g., $Li_uNi_{1-s}Co_sO_2$), a lithium manganese cobalt composite oxide (e.g., $Li_uMn_sCo_{1-s}O_2$), a lithium nickel cobalt manganese composite oxide (e.g., $Li_uNi_{1-s-t}Co_sMn_tO_2$), or a lithium-phosphorus oxide having an olivine structure (e.g., $Li_uFePO_4$, $Li_uMnPO_4$, $Li_uMn_{1-s}Fe_sPO_4$, and $Li_uCoPO_4$). This is because these preferable compounds facilitate high input/output performance and excellent life performance. The above compounds preferably satisfy $0<u\leq1$, $0\leq s\leq1$, and $0\leq t\leq1$.

Examples of the binder include polytetrafluoroethylene (PTFE), polyvinylidene fluoride (PVdF), fluorocarbon rubber, styrene-butadiene rubber (SBR), carboxymethyl cellulose (CMC), polyimide, and polyamide. One or two or more binders may be used.

Examples of the positive electrode conductive agent include carbon black such as acetylene black and Ketjen black, graphite, carbon nanotubes (CNTs), and fullerenes. One or two or more conductive agents may be used.

In the positive electrode active material-containing layer, the mixing ratio of the positive electrode active material is preferably 80 wt % or more and 95 wt % or less, the mixing ratio of the conductive agent is preferably 3 wt % or more and 18 wt % or less, and the mixing ratio of the binder is preferably 2 wt % or more and 17 wt % or less.

The current collector is preferably an aluminum foil or an aluminum alloy foil, and its average crystal particle size is preferably 50 µm or less, more preferably 30 µm or less, and even more preferably 5 µm or less. The current collector made from an aluminum foil or an aluminum alloy foil and having such an average crystal particle size realizes dramatic improvement of strength, allows the positive electrode to be increased in density by high pressing pressure, and increases battery capacity.

The aluminum foil or aluminum alloy foil having an average crystal particle size of 50 µm or less is affected in complexity by many factors such as a material composition, impurities, heating conditions, a heating process history, and heating conditions of annealing. The crystal particle size (diameter) is adjusted by combining the above factors in the manufacturing process.

The thickness of the current collector is preferably 20 µm or less and more preferably, 15 µm or less. The purity of the aluminum foil is preferably 99% or more. The aluminum alloy is preferably an alloy containing an element such as magnesium, zinc, silicon, etc. On the other hand, the content of a transition metal such as iron, copper, nickel, or chromium is preferably 1% or less.

The positive electrode is manufactured in the following manner. For example, the positive electrode material, the positive electrode conductive agent, and the binder are suspended in an appropriate solvent to obtain slurry. The obtained slurry is applied on the positive electrode current collector and is then dried to form the positive electrode active material-containing layer. The positive electrode active material-containing layer is then subjected to pressing. The positive electrode is manufactured in this manner. Alternatively, the positive electrode material, the positive electrode conductive agent, and the binder may be formed into a pellet shape and used as the positive electrode active material-containing layer.

The positive electrode active material-containing layer has a porosity of preferably 20% or more and 50% or less. The positive electrode including the positive electrode active material-containing layer having such a porosity is high in density and is excellent in affinity with a nonaqueous electrolyte. A porosity is more preferably 25% and more and 40% or less.

The density of the positive electrode active material-containing layer is preferably 2.5 g/cm$^3$ or more.

(3) Nonaqueous Electrolyte

Examples of the nonaqueous electrolyte include a liquid nonaqueous electrolyte prepared by dissolving an electrolyte salt in a nonaqueous solvent, and a gel-form nonaqueous electrolyte obtained by combining a liquid nonaqueous electrolyte and a polymer material.

Examples of the electrolyte salt include lithium salts such as lithium perchlorate (LiClO$_4$), lithium hexafluorophosphate (LiPF$_6$), lithium tetrafluoroborate (LiBF$_4$), hexafluoro arsenic lithium (LiAsF$_6$), difluorophosphinic acid lithium salt (LiPO$_2$F$_2$), lithium trifluoromethansulfonate (LiCF$_3$SO$_3$), and bistrifluoromethylsulfonylimide lithium [LiN(CF$_3$SO$_2$)$_2$]. These electrolyte salts may be singly used, or two or more of them may be used in combination.

It is preferable that the electrolyte salt(s) be dissolved within a range of 0.5 mol/L or more and 2.5 mol/L or less, relative to an organic solvent.

Examples of the nonaqueous solvent include: a cyclic carbonate such as ethylene carbonate (EC), propylene carbonate (PC), or vinylene carbonate (VC); a linear carbonate such as dimethyl carbonate (DMC), ethyl methyl carbonate (EMC), or diethyl carbonate (DEC); a cyclic ether such as tetrahydrofuran (THF) or 2 methyltetrahydrofuran (2MeTHF); a linear ether such as dimethoxy ethane (DME); a cyclic ether such as γ-butyrolactone (BL); a linear ester such as methyl acetate, ethyl acetate, methyl propionate, or ethyl propionate; acetonitrile (AN); and sulfolane (SL). These organic solvents may be singly used, or a mixture of two or more of them may be used.

Examples of the polymer material used for the gel nonaqueous electrolyte include polyvinylidene fluoride (PVdF), polyacrylonitrile (PAN), and polyethylene oxide (PEO).

(4) Separator

Examples of the separator include a porous film or synthetic resin nonwoven fabric including polyethylene, polypropylene, cellulose, or polyvinylidene fluoride (PVdF).

(5) Container Member

The container member may be made of a laminate film or may be constituted of a metal container. In the case of using the metal container, a lid may be separated from or integral with the container. The metal container preferably has a thickness of 0.5 mm or less, and more preferably 0.2 mm or less. The container member may be formed into a flat shape, a square shape, a cylindrical shape, a coin shape, a button shape, a sheet shape, a stack shape, etc. The battery may be a large battery mounted in a two wheel or four wheel vehicle, in addition to a compact battery mounted in a portable electronic device or the like.

The container member made of a laminate film preferably has a film thickness of 0.2 mm or less. Examples of the laminate film include a multi-layer film including resin films and a metal layer sandwiched between the resin films. For weight reduction, the metal layer is preferably an aluminum foil or an aluminum alloy film. For the resin foil, for example, a polymer material such as polypropylene (PP), polyethylene (PE), nylon, polyethylene terephthalate (PET), etc., may be used. The laminate film may be formed into the shape of the container member by heat-sealing.

The metal container is made of, e.g., aluminum or an aluminum alloy. The aluminum alloy is preferably an alloy containing an element such as magnesium, zinc, silicon, etc. For dramatic improvement of long-term reliability and heat dissipating properties in a high-temperature environment, the content of transition metal such as iron, copper, nickel, chromium, etc., in the aluminum or aluminum alloy is preferably 100 ppm or less.

An average crystal particle size of the metal container made of aluminum or an aluminum alloy is preferably 50 μm or less, more preferably 30 μm or less, and even more preferably 5 μm or less. By setting the average crystal particle size to 50 μm or less, the metal container made from aluminum or an aluminum alloy can be dramatically increased in strength, and the container can be made even thinner. This realizes a lightweight and high-output nonaqueous electrolyte battery that is excellent in long-term reliability and is suitable for onboard applications.

(6) Negative Electrode Terminal and Positive Electrode Terminal

A part of the negative electrode terminal is electrically connected to a part of the negative electrode. This connection allows the negative electrode terminal to function as a conductor for electrons to move between the negative electrode and the external terminal. The negative electrode terminal may be connected to, for example, the negative electrode current collector, in particular, to a negative electrode tab. Similarly, the positive electrode terminal is electrically connected to a part of the positive electrode. This connection allows the positive electrode terminal to function as a conductor for electrons to move between the positive electrode and the external terminal. The positive electrode terminal may be connected to, for example, the positive electrode current collector, in particular, to a positive electrode tab. The negative electrode terminal and the positive electrode terminal are preferably made from a material having high electric conductivity. If the terminals are connected to a current collector, they are preferably made of a material similar to that of the current collector in order to reduce the contact resistance.

Next, an example of the battery according to the embodiment will be described in more detail with reference to the drawings.

FIG. 4 is a partially cut-out perspective view showing an example of the battery according to the embodiment. FIG. 5 is an enlarged cross-sectional view of section A of the battery shown in FIG. 4.

A battery 100 shown in FIGS. 4 and 5 includes a flat electrode group 1. The flat electrode group 1 includes the negative electrode 2, a positive electrode 3, and a separator 4. The electrode group 1 has a structure in which the negative electrode 2 and the positive electrode 3 are wound in a spiral shape with the separator 4 interposed therebetween. The electrode group described herein is a wound-type electrode group; however, the electrode group may be a stacked-type electrode group formed of stacking plural of the negative electrodes 2, the separators 4, and the positive electrodes 3.

As shown in FIG. 5, the negative electrode 2 includes a negative electrode current collector 2a and each negative electrode active material-containing layer 2b supported on the negative electrode current collector 2a. As shown in FIG. 5, the positive electrode 3 includes a positive electrode current collector 3a and each positive electrode active material-containing layer 3b supported on the positive electrode current collector 3a. As shown in FIG. 5, the negative electrode active material-containing layer 2b includes a principal surface facing the positive electrode (the positive electrode active material-containing layer 3b).

As shown in FIG. 4, in the battery 100, a belt-like negative electrode terminal 5 is electrically connected to the negative electrode 2. More specifically, the negative electrode terminal 5 is connected to the negative electrode current collector 2a. A belt-like positive electrode terminal 6 is electrically connected to the positive electrode 3. More specifically, the positive electrode terminal 6 is connected to the positive electrode current collector 3a.

The battery 100 further includes a container 7 made of a laminate film, as a case. That is, the battery 100 includes a container member formed of the laminate-film made container 7.

The laminate-film made container 7 houses the electrode group 1. However, ends of the negative electrode terminal 5 and the positive electrode terminal 6 protrude from the container 7. The laminate-film made container 7 houses a nonaqueous electrolyte (not shown). The electrode group 1 is impregnated with the nonaqueous electrolyte. The container 7 has its peripheral edge heat-sealed. With this heat-sealing, the electrode group 1 and the nonaqueous electrolyte are sealed.

Next, another example of the battery according to a first embodiment will be described in detail with reference to FIG. 6. FIG. 6 is a partially cut-out perspective view showing another example of the battery according to the first embodiment.

A battery 200 shown in FIG. 6 differs from the battery 100 shown in FIGS. 4 and 5 in that the container member is formed of a metal container 17a and a sealing plate 17b.

A flat electrode group 11 includes the negative electrode, the positive electrode, and the separator, as in the electrode group 1 in the battery 100 shown in FIGS. 4 and 5. The electrode group 11 has a similar structure to that of the electrode group 1. In the electrode group 11, however, as described later, a negative electrode tab 15a and a positive electrode tab 16a, instead of the negative electrode terminal 5 and the positive electrode terminal 6, are connected to the negative electrode and the positive electrode, respectively.

In the battery 200 shown in FIG. 6, the electrode group 11 thus configured is housed in the metal container 17a. The metal container 17a further houses a nonaqueous electrolyte (not shown). The metal container 17a is sealed with the metal-made sealing plate 17b. The metal container 17a and the sealing plate 17b form, for example, a can container as a container member.

The negative electrode tab 15a has one end electrically connected to the negative electrode current collector and the other end electrically connected to the negative electrode terminal 15. The positive electrode tab 16a has one end electrically connected to the positive electrode current collector and the other end electrically connected to the positive electrode terminal 16 fixed to the sealing plate 17b. The positive electrode terminal 16 is fixed to the sealing plate 17b with an insulating member 17c interposed therebetween. The insulating member 17c achieves electrical insulation between the positive electrode terminal 16 and the sealing plate 17b.

The battery according to the first embodiment includes a positive electrode, and a negative electrode including a negative electrode active material-containing layer including a niobium-titanium composite oxide and a conductive agent that includes a carbon material. The negative electrode active material-containing layer includes a principal surface facing the positive electrode. Assuming that the thickness of the negative electrode active material-containing layer is A, a ratio (C2/C1) of carbon content ratio C2 at a depth of 0.5 A from the principal surface to carbon content ratio C1 at a depth of 1 µm from the principal surface satisfies $2 \leq C2/C1 \leq 30$. The battery can prevent self-discharge even when it is stored for a long time.

Second Embodiment

According to a second embodiment, a battery pack is provided. The battery pack includes the battery according to the first embodiment.

The battery pack according to the second embodiment may include a plurality of batteries. The plurality of batteries may be electrically connected in series or may be electrically connected in parallel. Alternatively, the plurality of batteries may be connected in combination of in-series and in-parallel connections.

The battery pack according to the second embodiment may include, for example, five batteries. These batteries may be connected in series. The batteries connected in series may form a battery module. That is, the battery pack according to the second embodiment may include a battery module.

The battery pack according to the second embodiment may include a plurality of battery modules. The plurality of battery modules may be connected in series, in parallel, or in a combination of in-series and in-parallel connections.

Hereinafter, an example of the battery pack according to the second embodiment will be described with reference to FIGS. 7 and 8. FIG. 7 is an exploded perspective view showing an example of the battery pack according to the second embodiment. FIG. 8 is a block diagram showing an example of an electric circuit of the battery pack shown in FIG. 7.

The battery pack 20 shown in FIGS. 7 and 8 includes a plurality of single-batteries 21. Each single-battery 21 may be the flat battery 100 which is one example of the battery according to the first embodiment described with reference to FIG. 4.

The single-batteries 21 are fastened with an adhesive tape 22 while each of them is stacked in such a manner that the negative electrode terminal 5 and the positive electrode terminal 6 both externally protruding are arranged in the same direction. In this manner, the single-batteries 21 form the battery module 23. These single-batteries 21 are electrically connected to each other in series, as shown in FIG. 8.

A printed wiring board 24 is arranged in such a manner as to face the side surface from which the negative electrode terminal 5 and the positive electrode terminal 6 of each single-battery 21 protrude out. As shown in FIG. 8, a thermistor 25, a protective circuit 26, and an energizing terminal 27 for energization to external device(s) are mounted on the printed wiring board 24. An electric insulating plate (not shown) is attached to the surface of the printed wiring board 24, which faces the battery module 23, in order to avoid unnecessary connection to wires of the battery module 23.

A positive electrode side lead 28 is connected to the positive electrode terminal 6 located lowermost in the battery module 23. The distal end of the positive electrode side lead 28 is inserted into a positive electrode side connector 29 of the printed wiring board 24 and is electrically connected thereto. A negative electrode side lead 30 is connected to the negative electrode terminal 5 located uppermost in the battery module 23. The distal end of the negative electrode side lead 30 is inserted into a negative electrode side connector 31 of the printed wiring board 24 and is electrically connected thereto. The connectors 29 and 31 are connected to the protective circuit 26 via wirings 32 and 33 formed on the printed wiring board 24.

The thermistor 25 detects the temperature of the single-batteries 21 and transmits detection signals to the protective circuit 26. The protective circuit 26 may cut off a plus-side wiring 34a and a minus-side wiring 34b between the protective circuit 26 and the energizing terminal 27 for energization to external device(s) under a predetermined condition. An example of the predetermined condition is that the temperature detected by the thermistor 25 reaches a predetermined temperature or more.

Another example of the predetermined condition is that over-charge, over-discharge, an over-current, or the like of the single-batteries 21 is detected. This detection of over-charge, etc., is performed on each of the single-batteries 21 or the entire battery module 23. When the detection is performed on each of the single-batteries 21, a battery voltage may be detected, or a positive electrode potential or a negative electrode potential may be detected. In the latter case, a lithium electrode to be used as a reference electrode may be inserted into each of the single-batteries 21. In the battery pack 20 shown in FIGS. 7 and 8, wires 35 for voltage detection are connected to the single-batteries 21, respectively. Detection signals are transmitted to the protective circuit 26 via the wires 35.

Protective sheets 36 made of rubber or resin are arranged on three side surfaces of the battery module 23, respectively, except for one side surface from which the positive electrode terminal 6 and the negative electrode terminal 5 protrude out.

The battery module 23 is housed in a housing container 37 together with the respective protective sheets 36 and the printed wiring board 24. That is, the protective sheets 36 are respectively arranged on both of the inner surfaces of the housing container 37 along the long side direction and on one of the inner surfaces along the short side direction. The printed wiring board 24 is arranged on the other inner surface along the short side direction. The battery module 23 is located inside a space surrounded by the protective sheets 36 and the printed wiring board 24. A lid 38 is attached to the upper surface of the housing container 37.

To fix the battery module 23, a heat shrinkable tape may be used in place of the adhesive tape 22. In this case, the protective sheets are arranged on both of the side surfaces of the battery module, and the heat-shrinkable tape is wrapped and then shrunk by heat to bind the battery module.

FIGS. 7 and 8 show the form in which the single-batteries 21 are connected in series. However, the single-batteries 21 may be connected in parallel in order to increase the battery capacity. Assembled battery packs may also be connected in series and/or in parallel.

The form of the battery pack according to the second embodiment is appropriately changed depending on applications. A preferable application of the battery pack according to the second embodiment is an application which requires a good cycling performance during a large current performance. Specific examples of the application include an application to a power source for a digital camera and an onboard application for a two-wheeled to four-wheeled hybrid electric vehicle, a two-wheeled to four-wheeled electric vehicle, an electric assist bicycle, etc. A preferable application of the battery pack according to the second embodiment is, in particular, an onboard application.

The battery pack according to the second embodiment includes the battery according to the first embodiment. Therefore, the battery pack according to the second embodiment can prevent self-discharge even when it is stored for a long time.

EXAMPLES

Hereinafter, the above embodiments will be described in more detail by way of examples.

Example 1

<Manufacture of Negative Electrode>
(Preparation of First Slurry (Slurry for Formation of First Region))
Carbon Coating Treatment As negative electrode active material particles, $TiNb_2O_7$ particles having a specific surface area of 10 $m^2/g$ according to the BET method based on $N_2$ absorption was prepared. $TiNb_2O_7$ contained many secondary particles. $TiNb_2O_7$ particles at 95 wt % and carboxymethyl cellulose (CMC) at 5 wt % were mixed, and ethanol was added to the mixture. The resultant mixture was pulverized using a ball mill to mix the particles uniformly. Heat treatment was performed on the mixed particles in an inert atmosphere at 700° C. for one hour, thereby forming a carbon-containing layer on the surfaces of the $TiNb_2O_7$ particles and on the inside of the secondary particles. In this manner, carbon-coated negative electrode active material particles were obtained. The content of carbon in the carbon-coated negative electrode active material particles was 1 wt %. The negative electrode active material particles had an average primary particle size of 1 μm and an average secondary particle size of 10 μm.
Preparation of Slurry The carbon-coated negative electrode active material particles, carbon black powder as a conductive agent, and PVdF as a binder were mixed at a weight ratio of 95:3:2, thereby obtaining a mixture. The obtained mixture was dispersed in an N-methylpyrrolidone (NMP) solvent and then stirred using a ball mill under the condition in which the number of revolutions was 1000 rpm and a stirring period was two hours. In this manner, the first slurry was prepared.
(Preparation of Second Slurry (Slurry for Formation of Second Region))

As negative electrode active material particles, $TiNb_2O_7$ particles having a specific surface area of 10 $m^2/g$ according to the BET method based on $N_2$ absorption was prepared. $TiNb_2O_7$ particles contained many primary particles. $TiNb_2O_7$ particles had an average primary particle size of 0.9 μm. $TiNb_2O_7$ particles mentioned in the above and polyvinylidene fluoride as a binder were prepared. $TiNb_2O_7$ particles and polyvinylidene fluoride were mixed at a weight ratio of 95:5, thereby obtaining a mixture. The obtained mixture was dispersed in an N-methylpyrrolidone (NMP) solvent and then stirred using a ball mill under the condition in which the number of revolutions was 1000 rpm and a stirring period was two hours. In this manner, the second slurry was prepared.
(Sequential Coating and Pressing)

The first slurry having a basis weight of 80 $g/m^2$ was applied onto both of the surfaces of an aluminum foil having a thickness of 15 μm, and was dried. Subsequently, the second slurry having a base weight of 5 $g/m^2$ was applied onto the first slurry, and was dried. The dried stack was subjected to pressing and then cut into a predetermined size. Thereafter, the cut stack was further subjected to vacuum drying. In this manner, the negative electrode was obtained. One of the long sides of the current collector was provided with a portion not holding the negative electrode active material-containing layer, and this portion was set to a negative electrode tab. The negative electrode active material-containing layer formed on both of the surfaces of the current collector had a thickness of 34 μm. The first region had a thickness of 32 μm. The second region had a thickness of 2 μm. As shown in Table 3, the ratio of the thickness of the first region to thickness A of the negative electrode active material-containing layer was 0.94, and the ratio of the thickness of the second region to thickness A of the negative electrode active material-containing layer was 0.06.

<Manufacture of Positive Electrode>

$LiNi_{0.33}Co_{0.33}Mn_{0.33}O_2$ particles were prepared as a positive electrode active material. Carbon black was prepared as a conductive agent. Polyvinylidene fluoride (PVdF) was prepared as a binder. $LiNi_{0.33}Co_{0.33}Mn_{0.33}O_2$ particles, carbon black, and PVdF mentioned in the above were mixed at a weight ratio of 90:5:5, thereby obtaining a mixture. Next, the obtained mixture was dispersed in an N-methylpyrrolidone (MAP) solvent, thereby preparing a positive electrode slurry. The positive electrode slurry was applied onto each of both the surfaces of an aluminum foil having a thickness of 15 μm and dried. Thereafter, the dried positive electrode slurry was subjected to roll pressing to cut it into a predetermined size. In this manner, the positive electrode was obtained.

Each positive electrode active material-containing layer had a thickness of 20 μm. One of the long sides of the current collector was provided with a portion not holding the positive electrode active material-containing layer, and this portion was set to a positive electrode tab.

<Manufacture of Electrode Group>

The obtained positive electrode and negative electrode were wound in a flat spiral shape while a cellulose fiber nonwoven fabric having a thickness of 15 μm and a void fraction of 70% was interposed between the positive electrode and the negative electrode. In this manner, a flat-shaped wound electrode group was manufactured.

<Preparation of Nonaqueous Electrolyte>

A mixed solvent was prepared by mixing propylene carbonate (PC) and diethyl carbonate (DEC) in such a manner as to have a volume ratio of 1:2. A liquid nonaqueous electrolyte was prepared by dissolving $LiPF_6$ as an electrolyte salt in the mixed solvent at a concentration of 1 M.

<Manufacture of Battery>

The manufactured electrode group was inserted into a metal can made from aluminum alloy (Al purity of 99%) having a thickness of 0.25 mm. Next, a liquid nonaqueous electrolyte was injected into the electrode group within a container, and then the container was sealed. In this manner, a square secondary battery having a thickness of 13 mm, a width of 62 mm, and a height of 96 mm was manufactured.

Example 2

The secondary battery was manufactured in the same manner as in Example 1 except that the first slurry was prepared as described below.

As negative electrode active material particles, $TiNb_2O_7$ particles having a specific surface area of 10 m²/g according to the BET method based on $N_2$ absorption was prepared. $TiNb_2O_7$ particles contained many primary particles. $TiNb_2O_7$ particles had an average primary particle size of 1 μm. $TiNb_2O_7$ particles did not contain the carbon-containing layer.

The negative electrode active material particles, carbon black powder as a conductive agent, and PVdF as a binder were mixed at a weight ratio of 90:6:4, thereby obtaining a mixture. The obtained mixture was dispersed in an N-methylpyrrolidone (NMP) solvent and then stirred using a ball mill under the condition in which the number of revolutions was 1000 rpm and a stirring period was two hours. In this manner, the first slurry was prepared.

Example 3

The secondary battery was manufactured in the same manner as in Example 1 except that the first slurry was prepared as described below.

As negative electrode active material particles, $TiNb_2O_7$ particles having a specific surface area of 5 m²/g according to the BET method based on $N_2$ absorption was prepared. $TiNb_2O_7$ contained many secondary particles. $TiNb_2O_7$ particles had an average secondary particle size of 12 μm. $TiNb_2O_7$ particles did not contain the carbon-containing layer.

The negative electrode active material particles, carbon black powder as a conductive agent, and PVdF as a binder were mixed at a weight ratio of 90:6:4, thereby obtaining a mixture. The obtained mixture was dispersed in an N-methylpyrrolidone (NMP) solvent and then stirred using a ball mill under the condition in which the number of revolutions was 1000 rpm and a stirring period was two hours. In this manner, the first slurry was prepared.

Example 4

The secondary battery was manufactured in the same manner as in Example 3 except for the following. When the first slurry was prepared, the negative electrode active material particles, carbon black powder as a conductive agent, and PVdF as a binder were mixed at a weight ratio of 95:3:2.

Example 5

The secondary battery was manufactured in the same manner as in Example 1 except that the first slurry was prepared as described below.

Carbon Coating Treatment

As negative electrode active material particle, $TiNb_2O_7$ particles having a specific surface area of 8 m²/g according to the BET method based on $N_2$ absorption was prepared. $TiNb_2O_7$ contained many secondary particles. $TiNb_2O_7$ particles at 95 wt % and carboxymethyl cellulose (CMC) at 5 wt % were mixed, and ethanol was added to the mixture. The resultant mixture was pulverized using a ball mill to mix the particles uniformly. Heat treatment was performed on the mixed particles in an inert atmosphere at 700° C. for one hour, thereby forming a carbon-containing layer on the surfaces of $TiNb_2O_7$ particles and on the inside of the secondary particles. In this manner, carbon-coated negative electrode active material particles were obtained. The content of carbon in the carbon-coated negative electrode active material particles was 1 wt %. The negative electrode active material particles thus obtained had an average primary particle size of 1.5 μm and an average secondary particle size of 20 μm.

Preparation of Slurry

The negative electrode active material particles, carbon black powder as a conductive agent, and PVdF as a binder were mixed at a weight ratio of 97:1:2, thereby obtaining a mixture. The obtained mixture was dispersed in an N-methylpyrrolidone (NMP) solvent and then stirred using a ball mill under the condition in which the number of revolutions was 1000 rpm and a stirring period was two hours. In this manner, the first slurry was prepared.

Example 6

The secondary battery was manufactured in the same manner as in Example 1 except that the first slurry was prepared as described below.
Carbon Coating Treatment As negative electrode active material particles, $TiNb_2O_7$ particles having a specific surface area of 8 m$^2$/g according to the BET method based on N$_2$ absorption was prepared. $TiNb_2O_7$ contained many secondary particles. $TiNb_2O_7$ particles at 95 wt % and carboxymethyl cellulose (CMC) at 5 wt % were mixed, and ethanol was added to the mixture. The resultant mixture was pulverized using a ball mill to mix the particles uniformly. Heat treatment was performed on the mixed particles in an inert atmosphere at 700° C. for one hour, thereby forming a carbon-containing layer on the surfaces of $TiNb_2O_7$ particles and on the inside of the secondary particles. In this manner, carbon-coated negative electrode active material particles were obtained. The content of carbon in the carbon-coated negative electrode active material particles was 1 wt %. The negative electrode active material particles had an average primary particle size of 0.8 μm and an average secondary particle size of 7 μm.
Preparation of Slurry The carbon-coated negative electrode active material particles, carbon black powder as a conductive agent, and PVdF as a binder were mixed at a weight ratio of 90:6:4, thereby obtaining a mixture. The obtained mixture was dispersed in an N-methylpyrrolidone (NMP) solvent and then stirred using a ball mill under the condition in which the number of revolutions was 1000 rpm and a stirring period was two hours. In this manner, the first slurry was prepared.

Example 7

The secondary battery was manufactured in the same manner as in Example 1 except that the first slurry and the second slurry were prepared as described below.
(Preparation of First Slurry (Slurry for Formation of First Region))
Carbon Coating Treatment As negative electrode active material particles, $TiNb_2O_7$ particles having a specific surface area of 10 m$^2$/g according to the BET method based on N$_2$ absorption was prepared. $TiNb_2O_7$ contained many secondary particles. $TiNb_2O_7$ particles at 95 wt % and carboxymethyl cellulose (CMC) at 5 wt % were mixed, and ethanol was added to the mixture. The resultant mixture was pulverized using a ball mill to mix the particles uniformly. Heat treatment was performed on the mixed particles in an inert atmosphere at 700° C. for one hour, thereby forming a carbon-containing layer on the surfaces of $TiNb_2O_7$ particles and on the inside of the secondary particles. In this manner, carbon-coated negative electrode active material particles were obtained. The content of carbon in the carbon-coated negative electrode active material particles was 1 wt %. The negative electrode active material particles had an average primary particle size of 1 μm and an average secondary particle size of 10 μm.
Preparation of Slurry The carbon-coated negative electrode active material particles, carbon black powder as a conductive agent, carboxymethyl cellulose (CMC) as a binder, and styrene-butadiene rubber (SBR) as a binder were mixed at a weight ratio of 94:2:2:2, thereby obtaining a mixture. The obtained mixture was dispersed in an aqueous solvent and then stirred using a planetary mixer under the condition in which the number of revolutions was 80 rpm and a stirring period was two hours. In this manner, the first slurry was prepared.
(Preparation of Second Slurry (Slurry for Formation of Second Region))

As negative electrode active material particles, $TiNb_2O_7$ particles having a specific surface area of 10 m$^2$/g according to the BET method based on N$_2$ absorption was prepared. $TiNb_2O_7$ particles contained many primary particles. $TiNb_2O_7$ particles had an average primary particle size of 0.9 μm. $TiNb_2O_7$ particles mentioned in the above, carboxymethyl cellulose (CMC) as a binder, and styrene-butadiene rubber (SBR) as a binder were prepared. $TiNb_2O_7$ particles, CMC, and SBR were mixed at a weight ratio of 96:2:2, thereby obtaining a mixture. The obtained mixture was dispersed in an aqueous solvent and then stirred using a planetary mixer under the condition in which the number of revolutions was 80 rpm and a stirring period was two hours. In this manner, the second slurry was prepared.

Example 8

The secondary battery was manufactured in the same manner as in Example 7 except that the first slurry was prepared as described below.

As negative electrode active material particles, $TiNb_2O_7$ particles having a specific surface area of 5 m$^2$/g according to the BET method based on N$_2$ absorption was prepared. $TiNb_2O_7$ contained many secondary particles. $TiNb_2O_7$ particles had an average primary particle size of 12 μm. $TiNb_2O_7$ particles did not contain the carbon-containing layer.

The negative electrode active material particles, carbon black powder as a conductive agent, carboxymethyl cellulose (CMC) as a binder, and styrene-butadiene rubber (SBR) as a binder were mixed at a weight ratio of 90:5:2.5:2.5, thereby obtaining a mixture. The obtained mixture was dispersed in an aqueous solvent and then stirred using a planetary mixer under the condition in which the number of revolutions was 80 rpm and a stirring period was two hours. In this manner, the first slurry was prepared.

Example 9

The secondary battery was manufactured in the same manner as in Example 8 except that application and drying of the first slurry and the second slurry were performed by two-layer simultaneous coating.

The two-layer simultaneous coating was performed by the method described in the above with reference to FIGS. 2 and 3. As the negative electrode current collector, an aluminum foil having a thickness of 15 μm was used. The first slurry having a basis weight of 80 g/m$^2$ and the second slurry having a basis weight of 5 g/m$^2$ were simultaneously applied onto both of the surfaces of this aluminum foil, and were simultaneously dried. The dried stack was subjected to pressing and then cut into a predetermined size. Thereafter, the cut stack was further subjected to vacuum drying. In this manner, the negative electrode was obtained.

Example 10

The secondary battery was manufactured in the same manner as in Example 1 except that application and drying of the first slurry and the second slurry were performed by two-layer simultaneous coating.

The two-layer simultaneous coating was performed by the method described in the above with reference to FIGS. 2 and 3. As the negative electrode current collector, an aluminum foil having a thickness of 15 µm was used. The first slurry having a basis weight of 80 g/m² and the second slurry having a basis weight of 5 g/m² were simultaneously applied onto both of the surfaces of this aluminum foil, and were simultaneously dried. The dried stack was subjected to pressing and then cut into a predetermined size. Thereafter, the cut stack was further subjected to vacuum drying. In this manner, the negative electrode was obtained.

Example 11

(Preparation of First Slurry (Slurry for Formation of First Region))

$Li_2Na_{1.6}Ti_{5.6}Nb_{0.4}O_{14}$ negative electrode active material particles coated with carbon by a similar method as in Example 1 were prepared. $Li_2Na_{1.6}Ti_{5.6}Nb_{0.4}O_{14}$ negative electrode active material particles contain many secondary particles. The aforementioned negative electrode active material particles had an average primary particle size of 1 µm and an average secondary particle size of 10 µm. The amount of carbon contained in $Li_2Na_{1.6}Ti_{5.6}Nb_{0.4}O_{14}$ negative electrode active material particles coated with carbon was 1 wt %. The carbon-coated $Li_2Na_{1.6}Ti_{5.6}Nb_{0.4}O_{14}$ negative electrode active material particles, acetylene black powder as a conductive agent, and PVdF as a binder were mixed at a weight ratio of 95:3:2, thereby obtaining a mixture. The obtained mixture was dispersed in an N-methylpyrrolidone (NMP) solvent and then stirred using a ball mill under the condition in which the number of revolutions was 1000 rpm and a stirring period was two hours. In this manner, the first slurry was prepared.

(Preparation of Second Slurry (Slurry for Formation of Second Region))

As negative electrode active material particles, $Li_2Na_{1.6}Ti_{5.6}Nb_{0.4}O_{14}$ particles having a specific surface area of 10 m²/g according to the BET method based on $N_2$ absorption was prepared. $Li_2Na_{1.6}Ti_{5.6}Nb_{0.4}O_{14}$ particles contain many primary particles. $Li_2Na_{1.6}Ti_{5.6}Nb_{0.4}O_{14}$ particles had an average primary particle size of 0.9 µm. $Li_2Na_{1.6}Ti_{5.6}Nb_{0.4}O_{14}$ particles mentioned in the above, and polyvinylidene fluoride as a binder were prepared. $Li_2Na_{1.6}Ti_{5.6}Nb_{0.4}O_{14}$ particles and polyvinylidene fluoride were mixed at a weight ratio of 95:5, thereby obtaining a mixture. The obtained mixture was dispersed in an N-methylpyrrolidone (NMP) solvent and then stirred using a ball mill under the condition in which the number of revolutions was 1000 rpm and a stirring period was two hours. In this manner, the second slurry was prepared.

(Two-Layer Simultaneous Coating and Pressing)

As the negative electrode current collector, an aluminum foil having a thickness of 15 µm was used. The first slurry having a basis weight of 110 g/m² and the second slurry having a basis weight of 5 g/m² were simultaneously applied onto both of the surfaces of this aluminum foil, and were simultaneously dried. The dried stack was subjected to pressing and then cut into a predetermined size. Thereafter, the cut stack was further subjected to vacuum drying. In this manner, the negative electrode was obtained. The second battery was manufactured in the same manner as in Example 1 except that the negative electrode thus manufactured was used.

Comparative Example 1

The secondary battery was manufactured in the same manner as in Example 1 except that only the first slurry was used.

Comparative Example 2

The secondary battery was produced in the same manner as in Example 1 except for the following. When the first slurry was prepared, the negative electrode active material particles, acetylene black powder as a conductive agent, and PVdF as a binder were mixed at a weight ratio of 80:17:3.

Tables 1 and 2 below describe the conditions for manufacturing the second batteries in Examples 1 to 11 and Comparative Examples 1 and 2. In tables 1 and 2, the column of "Particle Form of Negative Electrode Active Material" describes a particle form of a primary particle or a secondary particle occupying the negative electrode active material particles, whichever is larger in terms of weight ratio. The column of "Average Particle Size of Negative Electrode Active Material (µm)" describes an average particle size of the respective particle forms listed in the column of "Particle Form of Negative Electrode Active Material". For example, in the column of "Average Particle Size of Negative Electrode Active Material (µm)", a section corresponding to Example 2 shows an average particle size of primary particles in the negative electrode active material particles, while a section corresponding to Example 5 shows an average particle size of secondary particles in the negative electrode active material particles. The column of "C coat" describes whether or not a carbon-containing layer is contained in the negative electrode active material particles used in the slurry concerned.

TABLE 1

| | | | First Slurry | | | | | |
|---|---|---|---|---|---|---|---|---|
| | Slurry Coating Method | Type of Negative Electrode Active Material | Particle Form of Negative Electrode Active Material | Specific Surface Area of Negative Electrode Active Material (m²/g) | Average Particle Size of Negative Electrode Active Material (µm) | C Coating | Type of Binder | Weight Ratio Active material:Conductive Agent:Binder |
| Example 1 | Sequential Coating | $Nb_2TiO_7$ | Secondary Particles | 10 | 10 | Present | PVdF | 95:3:2 |
| Example 2 | Sequential Coating | $Nb_2TiO_7$ | Primary Particles | 10 | 1 | Absent | PVdF | 90:6:4 |
| Example 3 | Sequential Coating | $Nb_2TiO_7$ | Secondary Particles | 5 | 12 | Absent | PVdF | 90:6:4 |

TABLE 1-continued

| | | First Slurry | | | | | | |
|---|---|---|---|---|---|---|---|---|
| | Slurry Coating Method | Type of Negative Electrode Active Material | Particle Form of Negative Electrode Active Material | Specific Surface Area of Negative Electrode Active Material (m²/g) | Average Particle Size of Negative Electrode Active Material (μm) | C Coating | Type of Binder | Weight Ratio Active material:Conductive Agent:Binder |
| Example 4 | Sequential Coating | Nb$_2$TiO$_7$ | Secondary Particles | 5 | 12 | Absent | PVdF | 95:3:2 |
| Example 5 | Sequential Coating | Nb$_2$TiO$_7$ | Secondary Particles | 8 | 20 | Present | PVdF | 97:1:2 |
| Example 6 | Sequential Coating | Nb$_2$TiO$_7$ | Secondary Particles | 8 | 7 | Present | PVdF | 90:6:4 |
| Example 7 | Sequential Coating | Nb$_2$TiO$_7$ | Secondary Particles | 10 | 10 | Present | CMC, SBR | 94:2:4 |
| Example 8 | Sequential Coating | Nb$_2$TiO$_7$ | Secondary Particles | 5 | 12 | Absent | CMC, SBR | 90:5:5 |
| Example 9 | Two-Layer Simultaneous Coating | Nb$_2$TiO$_7$ | Secondary Particles | 5 | 12 | Absent | CMC, SBR | 90:5:5 |
| Example 10 | Two-Layer Simultaneous Coating | Nb$_2$TiO$_7$ | Secondary Particles | 10 | 10 | Present | PVdF | 90:3:2 |
| Example 11 | Two-Layer Simultaneous Coating | Li$_2$Na$_{1.6}$Ti$_{5.6}$Nb$_{0.4}$O$_{14}$ | Secondary Particles | 10 | 10 | Present | PVdF | 95:3:2 |
| Comparative Example 1 | Sequential Coating | Nb$_2$TiO$_7$ | Secondary Particles | 10 | 10 | Present | PVdF | 95:3:2 |
| Comparative Example 2 | Sequential Coating | Nb$_2$TiO$_7$ | Secondary Particles | 10 | 10 | Present | PVdF | 80:17:3 |

TABLE 2

| | Second Slurry | | | | | |
|---|---|---|---|---|---|---|
| | Type of Negative Electrode Active Material | Particle Form of Negative Electrode Active Material | Average Particle Size of Negative Electrode Active Material (μm) | C Coating | Type of Binder | Weight Ratio Active material:Conductive Agent:Binder |
| Example 1 | Nb$_2$TiO$_7$ | Primary Particles | 0.9 | Absent | PVdF | 95:0:5 |
| Example 2 | Nb$_2$TiO$_7$ | Primary Particles | 0.9 | Absent | PVdF | 95:0:5 |
| Example 3 | Nb$_2$TiO$_7$ | Primary Particles | 0.9 | Absent | PVdF | 95:0:5 |
| Example 4 | Nb$_2$TiO$_7$ | Primary Particles | 0.9 | Absent | PVdF | 95:0:5 |
| Example 5 | Nb$_2$TiO$_7$ | Primary Particles | 0.9 | Absent | PVdF | 95:0:5 |
| Example 6 | Nb$_2$TiO$_7$ | Primary Particles | 0.9 | Absent | PVdF | 95:0:5 |
| Example 7 | Nb$_2$TiO$_7$ | Primary Particles | 0.9 | Absent | CMC, SBR | 96:0:4 |
| Example 8 | Nb$_2$TiO$_7$ | Primary Particles | 0.9 | Absent | CMC, SBR | 96:0:4 |
| Example 9 | Nb$_2$TiO$_7$ | Primary Particles | 0.9 | Absent | CMC, SBR | 96:0:4 |
| Example 10 | Nb$_2$TiO$_7$ | Primary Particles | 0.9 | Absent | PVdF | 95:0:5 |
| Example 11 | Li$_2$Na$_{1.6}$Ti$_{5.6}$Nb$_{0.4}$O$_{14}$ | Primary Particles | 0.9 | Absent | PVdF | 95:0:5 |
| Comparative Example 1 | — | — | — | — | — | — |
| Comparative Example 2 | Nb$_2$TiO$_7$ | Primary Particles | 0.9 | Absent | PVdF | 95:0:5 |

<XPS and Calculation of Ratio (C2/C1)>

With respect to each of the negative electrodes respectively included in the secondary batteries according to Examples 1 to 11 and Comparative Examples 1 and 2, carbon content ratios C1 and C2 were measured by X-ray photoelectron spectroscopy according to the method described in the first embodiment. The ratio (C2/C1) was calculated based on carbon content ratios C1 and C2 thus obtained.

<Self-Discharge Test>

With respect to each of the secondary batteries according to Examples 1 to 11 and Comparative Examples 1 and 2, a self-discharge test was performed by the following method.

First, the battery was charged up to SOC of 100%. After the battery surface temperature reached 25° C.±3° C. within a thermostatic bath at 25° C., the battery was discharged at a constant current of 1 C, and then discharge capacity C0 was measured. Next, after the battery was charged up to SOC of 100%, the battery was stored within a thermostatic bath at 60° C. for four weeks. After the storage, remaining capacity C4 was measured. Remaining capacity C4 was measured by discharging the battery at a constant current of 1 C after the battery surface temperature reached 25° C.±3° C. within in the thermostatic bath at 25° C. Herein, the discharging termination condition was set to a point when the battery voltage reached 1.8 V. A value obtained by dividing remaining capacity C4 measured after the storage test by discharge capacity C0 measured before the storage test is multiplied by 100. A percentage thus obtained is set to a remaining capacity retention ratio (%).

Results of the above are described in Table 3. Table 3 describes a thickness of the negative electrode material-containing layer, a thickness of the first region formed on the negative electrode current collector, and a thickness of the second region formed on the first region. In Table 3, the columns of "Thickness of First Region (μm)" and "Thickness of Second Region (μm)" describe thicknesses of the first and second regions, respectively, and further describe, in parentheses, ratios of these thicknesses to the negative electrode active material-containing layer.

TABLE 3

| | Thickness of Negative Electrode active Material-Containing Layer (μm) | Thickness of First Region (μm) | Thickness of Second Region (μm) | Carbon Content Ratio C1 (atm %) | Carbon Content Ratio C2 (atm %) | Ratio C2/C1 | Remaining Capacity Retention Ratio (%) |
|---|---|---|---|---|---|---|---|
| Example 1 | 34 | 32 (0.94 times) | 2 (0.06 times) | 1.5 | 31.5 | 21 | 89 |
| Example 2 | 34 | 32 (0.94 times) | 2 (0.06 times) | 1.7 | 30.6 | 18 | 90 |
| Example 3 | 35 | 33 (0.94 times) | 2 (0.06 times) | 2.2 | 28.8 | 13 | 90 |
| Example 4 | 32 | 31 (0.97 times) | 1 (0.03 times) | 2.7 | 21.6 | 8 | 88 |
| Example 5 | 33 | 31 (0.94 times) | 2 (0.06 times) | 2.6 | 8 | 3 | 83 |
| Example 6 | 36 | 33 (0.92 times) | 3 (0.08 times) | 1.4 | 40.5 | 29 | 86 |
| Example 7 | 34 | 32 (0.94 times) | 2 (0.06 times) | 1.7 | 34 | 20 | 89 |
| Example 8 | 32 | 31 (0.97 times) | 1 (0.03 times) | 2.5 | 40 | 16 | 91 |
| Example 9 | 32 | 30.5 (0.95 times) | 1.5 (0.05 times) | 2.3 | 34.5 | 15 | 90 |
| Example 10 | 33 | 31.5 (0.95 times) | 1.5 (0.05 times) | 1.5 | 31.8 | 21 | 87 |
| Example 11 | 33 | 31.5 (0.95 times) | 1.5 (0.05 times) | 1.6 | 33.6 | 21 | 87 |
| Comparative Example 1 | 32 | 32 | — | 22.5 | 36 | 1.6 | 79 |
| Comparative Example 2 | 38 | 36 | 2 | 1.5 | 49.5 | 33 | 80 |

As is clear from Tables 1 to 3, Examples 1 to 11 in which the ratio (C2/C1) satisfies 2≤C2/C1≤30 were excellent in remaining capacity retention ratio. On the other hand, Comparative Examples 1 and 2 in which the ratio (C2/C1) does not satisfy 2≤C2/C1≤30 were inferior in remaining capacity retention ratio to Examples 1 to 11.

Among Examples 1 to 11, Examples 1 to 4 and 7 to 11 in which the ratio (C2/C1) falls within a range from 8 to 21 were especially superior in remaining capacity retention ratio. From this, it is understood that self-discharge was prevented remarkably in Examples 1 to 4 and 7 to 11. If the ratio (C2/C1) is too small, for example, electron conductivity of the second region is too high to prevent self-discharge sufficiently. If the ratio (C2/C1) is too large, even in the presence of the second region that is low in carbon content ratio C1, electron conductivity of the first region is too high to prevent self-discharge sufficiently.

The above is also clear from Comparative Example 2. Although Comparative Example 2 has the same second region as that of Examples 1 to 6 and 10, the ratio (C2/C1) of Comparative Example 2 is more than 30 due to high carbon content ratio C2 in the first region. As a result, Comparative Example 2 was inferior in remaining capacity retention ratio.

In Example 5, the carbon-containing layer was included in the negative electrode active material particles in the first region. However, the conductive agent was small in weight with respect to the negative electrode active material-containing layer. For this reason, carbon content ratio C2 in the first region was relatively small, and the ratio (C2/C1) was 3.

In Example 6, the carbon-containing layer was included in the negative electrode active material particles in the first region, and the conductive agent was large in weight with respect to the negative electrode active material-containing layer. For this reason, carbon content ratio C2 in the first region was relatively large, and the ratio (C2/C1) was 29.

According to at least one of the embodiments and examples described above, a battery is provided. The battery includes a positive electrode, and a negative electrode including a negative electrode active material-containing layer including a niobium-titanium composite oxide and a conductive agent that includes a carbon material. The negative electrode active material-containing layer includes a principal surface facing the positive electrode. Assuming that the thickness of the negative electrode active material-containing layer is A, a ratio (C2/C1) of carbon content ratio C2 at a depth of 0.5 A from the principal surface to carbon content ratio C1 at a depth of 1 µm from the principal surface satisfies 2≤C2/C1≤30. The battery thus configured can prevent self-discharge even when it is stored for a long time.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and modifications may be made without departing from the scope of the inventions. The accompanying claims and their equivalents are intended to cover such forms or modifications, and would fall within the scope of the inventions described in the claims or an equivalent scope.

What is claimed is:

1. A battery comprising:
   a negative electrode comprising a negative electrode active material-containing layer, the negative electrode active material-containing layer comprises a negative electrode active material being a niobium-titanium composite oxide and a conductive agent comprising a carbon material; and
   a positive electrode,
   wherein the negative electrode active material-containing layer comprises a principal surface facing the positive electrode,
   assuming that a thickness of the negative electrode active material-containing layer is A, a ratio (C2/C1) of carbon content ratio C2 at a depth of 0.5 A from the principal surface to carbon content ratio C1 at a depth of 1 µm from the principal surface satisfies 2≤C2/C1≤30,
   the carbon content ratio C1 at the depth of 1 µm from the principal surface is 2.7 atm % or less, and
   the carbon content ratio C2 at the depth of 0.5 A from the principal surface is 8 atm % or more and 40.5 atm % or less,
   wherein the carbon content ratio C1 and the carbon content ratio C2 are measured by X-ray photoelectron spectroscopy.

2. The battery according to claim 1, wherein the ratio (C2/C1) satisfies 8≤C2/C1≤21.

3. The battery according to claim 1,
   wherein the negative electrode further comprises a negative electrode current collector,
   the negative electrode active material-containing layer comprises a first region that is stacked on the negative electrode current collector,
   the first region comprises a portion at a depth of 0.5 A from the principal surface, and
   the niobium-titanium composite oxide included in the first region is particles, and the particles are covered with a carbon-containing layer.

4. The battery according to claim 3,
   wherein the negative electrode active material-containing layer further comprises a second region comprising a portion at a depth of 1 µm from the principal surface, and
   a thickness of the second region from the principal surface is 3 µm or less.

5. The battery according to claim 4, wherein the second region consists of the niobium-titanium composite oxide and a binder.

6. A battery pack comprising the battery according to claim 1.

7. The battery according to claim 1, the carbon content ratio C2 at the depth of 0.5 A from the principal surface is 40.5 atm % or less.

8. The battery according to claim 1, the carbon material is at least one selected from the group consisting of: vapor grown carbon fibers, carbon black, graphite, carbon nanotubes, fullerenes.

* * * * *